United States Patent [19]

Elliott et al.

[11] Patent Number: 5,497,405
[45] Date of Patent: Mar. 5, 1996

[54] OPEN LOOP DESYNCHRONIZER

[75] Inventors: Paul M. Elliott, Jenner; Fredrik Nordling, San Rafael, both of Calif.

[73] Assignee: DSC Communications Corporation, Plano, Tex.

[21] Appl. No.: 87,846

[22] Filed: Jul. 1, 1993

[51] Int. Cl.[6] .................................................. H04L 7/00
[52] U.S. Cl. .................................... 375/372; 370/102
[58] Field of Search ................................ 375/118, 371, 375/372, 373, 354, 375; 370/102, 105.3, 47, 48, 49, 108; 331/172, 173; 327/141, 144, 145, 154, 39, 47

[56] References Cited

U.S. PATENT DOCUMENTS

| | | | |
|---|---|---|---|
| 4,791,652 | 12/1988 | McEachern et al. | 375/118 |
| 5,052,025 | 9/1991 | Duff et al. | 375/118 |
| 5,131,013 | 7/1992 | Choi | 375/118 |
| 5,268,935 | 12/1993 | Mediavilla et al. | 375/118 |
| 5,339,338 | 8/1994 | Elliott | 375/372 |
| 5,367,545 | 11/1994 | Yamashita et al. | 375/372 |

Primary Examiner—Stephen Chin
Assistant Examiner—Hai H. Phan
Attorney, Agent, or Firm—Baker & Botts

[57] ABSTRACT

An open loop desynchronizer (10) includes a demapper (12) that reads asynchronous data from a synchronous channel (14) and writes this data to a first in first out buffer (18). The demapper (12) decodes deviations from a nominal stuff bit rate that indicates whether fewer or more stuff bits than data bits are needed on the synchronous channel (14) and generates a frequency deviation control signal (20) therefrom. The frequency deviation control signal (20) drives a digital filter (22) and a numerically controlled oscillator (24). The digital filter (22) and numerically controlled oscillator (24) generate a transmit clock (26) that tracks the asynchronous payload rate according to unit pulses on the frequency deviation control signal (20). The first in first out buffer (18) transmits the asynchronous data over a transmit data line (28) according to the asynchronous payload rate generated on the transmit clock (26).

22 Claims, 2 Drawing Sheets

OPEN LOOP DESYNCHRONIZER

TECHNICAL FIELD OF THE INVENTION

This invention relates in general to signal processing technologies and more particularly to an open loop desynchronizer.

BACKGROUND OF THE INVENTION

A desynchronizer is a device that reads and transmits asynchronous data carried over a synchronous channel. A synchronizer is used in conjunction with a desynchronizer and is allocated sufficient bandwidth over the synchronous channel to carry the maximum data rate with control signals being used to indicate the amount of data actually contained within the synchronous channel. Excess bandwidth is used for asynchronous data within the synchronous channel and is filled with bits carrying no information, or stuff bits. A pointer adjustment technique may be used in lieu of, or in addition to, stuff bits to indicate changes in the data rate of the synchronous channel. The synchronous channel also contains additional data, known as overhead, in addition to the asynchronous payload data. The variations in the instantaneous rate of the payload data caused by the interspersing of this overhead data and the stuff bits or pointer adjustments can give rise to what is called payload mapping jitter which can feed through into the desynchronizer output.

Conventional desynchronizers have typically included a first in first out (FIFO) buffer, a phase detector to measure the FIFO buffer depth, a passive or active analog loop filter to filter the phase detector output, and a voltage controlled oscillator (VCO) to generate an output clock to control data transmission from the FIFO buffer. These elements make up a phase locked loop (PLL) traditionally used in desynchronizers. The mapping jitter due to instantaneous variations in the FIFO buffer depth must be filtered within a PLL circuit often requiring undesirable compromises in the loop response. The phase locked loop circuit is usually implemented as an analog design, though replacement of one or more of these sections with digital circuitry is practical in many cases.

The purpose of the PLL circuit is to keep the FIFO buffer at a constant depth, typically half full. The FIFO buffer depth is filtered and used to drive the PLL circuit in order to control the clock frequency of the VCO used to read data from the FIFO buffer. Extra data written into the FIFO buffer is reflected on the clock signal of the VCO such that data is read out from the FIFO buffer a little faster to bring the FIFO buffer depth back to its nominal level. Less data causes the VCO to generate a slower clock signal, slowing down data transmission from the FIFO buffer and maintaining a nominal FIFO buffer depth. Instantaneous variations in the FIFO buffer depth filter through the PLL circuit, causing mapping jitter to appear on the desynchronizer output.

To avoid overflow and underflow of the FIFO, a PLL desynchronizer has feedback which must compensate for unavoidable variations in phase detector, loop filter, and VCO characteristics. Both analog and digital PLL designs require that the phase detector, loop filter, and VCO be well characterized and stable for proper dynamic performance of the desynchronizer. Shifts in the characteristics of these elements may result in excessive overshoot in the PLL step response, leading to jitter amplification and other undesirable effects. It is therefore desirable to eliminate mapping jitter feed-through and excessive overshoot in the PLL step response and simplify the circuitry as compared to conventional PLL desynchronizer designs.

From the foregoing it may be appreciated that a need has arisen for a desynchronizer that eliminates mapping jitter feedthrough into the desynchronizer output normally found in conventional desynchronizer designs due to the variations in the instantaneous rate of the FIFO buffer depth. A need has also arisen for a desynchronizer that eliminates overshoot from the desynchronizer step response and eliminates gain in the jitter transfer function. Further, a need has arisen for a simplified desynchronizer design which avoids feedback problems found in conventional PLL desynchronizer designs.

SUMMARY OF THE INVENTION

In accordance with the present invention, an open loop desynchronizer is provided which substantially eliminates or reduces disadvantages and problems associated with conventional PLL desynchronizer designs.

The present invention includes a demapper that generates enabling signals used to read the asynchronous data from the synchronous channel and write this data to a FIFO buffer. The demapper also decodes deviations from the nominal payload rate and generates a deviation control signal to drive a digital filter. The digital filter performs a low pass operation on the deviation control signal to remove a jitter causing high frequency component within the deviation control signal. The digital filter drives a numerically controlled oscillator that generates a clock signal for transmission of asynchronous data from the FIFO buffer.

The open loop desynchronizer of the present invention provides for various technical advantages. For example, one technical advantage is in the elimination of mapping jitter feedthrough onto the desynchronizer output. Another technical advantage is in the elimination of the overshoot that occurs in connection with PLL desynchronizer designs. Yet another technical advantage is in the elimination of a phase detector found in conventional desynchronizer designs and the phase locked loop adjustments required for variations generated by the phase detector. Still another technical advantage is the simplification of the desynchronizer design by avoiding the use of a feedback loop through the implementation of a numerically controlled oscillator. Other technical advantages are readily apparent to one skilled in the art from the following descriptions, figures, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
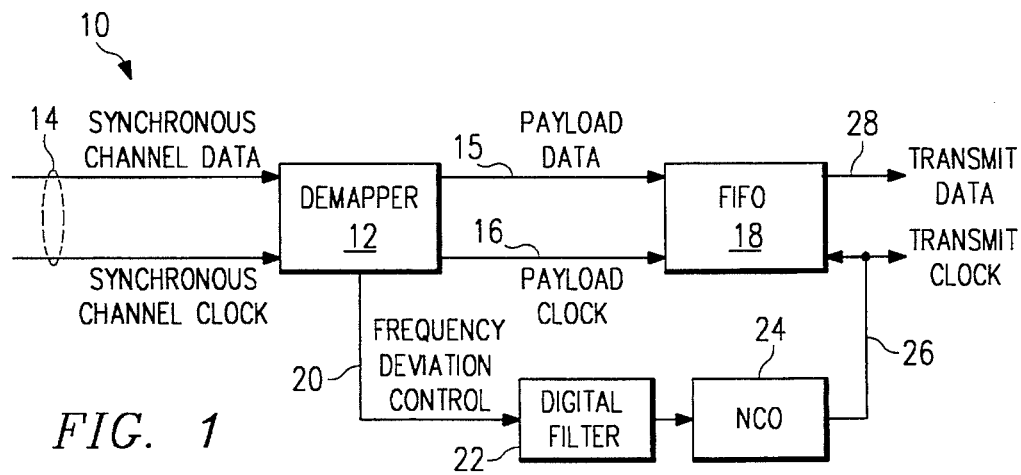
FIG. 1 illustrates a block diagram of an open loop desynchronizer.

FIG. 1 is a block diagram of an open loop desynchronizer 10. Open loop desynchronizer 10 includes a demapper circuit 12 that receives data and clock signals over a synchronous channel 14. Demapper circuit 12 generates an asynchronous payload data signal 15 and payload clock signal 16 for receipt at a first in, first out (FIFO) buffer 18. Demapper circuit 12 also generates a frequency deviation control signal 20 that drives a digital filter 22 which in turn drives a numerically controlled oscillator (NCO) 24. NCO 24 generates a transmit clock signal 26 to allow FIFO buffer 18 to send asynchronous data over transmit data signal 28.

In operation, demapper circuit 12 receives data and clock signals over synchronous channel 14. Synchronous channel 14 carries synchronous data at a maximum data rate over a predetermined bandwidth and includes control signals with overhead data interspersed within the synchronous data, that indicate the amount of data actually contained on synchronous channel 14. Bandwidth is allocated within synchronous channel 14 to carry the asynchronous payload. Desynchronizer 10 can operate with any generic synchronous channel, and mapping scheme, that carries stuff bits or uses pointer adjustments. However, desynchronizer 10 was specifically designed with reference to SONET VT1.5 specifications.

In one type of mapping technique under SONET VT1.5 mapping, bits carrying no information, or stuff bits, are used to fill synchronous channel 14. At increased payload rates, less stuff bits are needed to fill synchronous channel 14, while more stuff bits are required at decreased payload rates. The change in the use of stuff bits within synchronous channel 14 causes instantaneous variations in the data rate that is absorbed by FIFO buffer 18. Synchronous channel 14 will have a predetermined nominal payload frequency established by a nominal stuff bit rate from which the frequency of transmit clock signal 26 can be adjusted in response to stuff bits deviating from the nominal stuff bit rate.

In a second type of mapping technique under SONET VT1.5 mapping, a pointer indicates a beginning of a data structure. Changes in the data rate are indicated by incrementing or decrementing the pointer according to whether less data or more data is being transmitted, respectively. Typically, a pointer adjustment increases or decreases the data rate by 1 byte. Synchronous channel 14 will have a nominal payload frequency from which the frequency of transmit clock signal 26 can be adjusted in response to adjustments of the pointer.

Demapper circuit 12 generates frequency deviation control signal 20 from the stuff bit or pointer adjustment control signals on the synchronous channel by decoding deviations from the nominal stuff bit rate or the occurrence of a pointer adjustment. Frequency deviation control signal 20 drives digital filter 22 and ultimately NCO 24, adjusting the output frequency to match the original asynchronous payload rate. Demapper circuit 12 also generates the enabling signals used to read the asynchronous payload data from synchronous channel 14 and write this data to FIFO buffer 18.

Frequency deviation control signal 20 received by digital filter 22 is in the form of unit pulses where each negative unit pulse corresponds to one extra stuff bit transported by the stuffing mechanism (i.e., one fewer data bit being transported) and each positive unit pulse corresponds to one less stuff bit transported by the stuffing mechanism (i.e., one extra data bit being transported). Pointer adjustments (8 bits) are typically broken down into 8 individual unit pulses, or 16 individual half-unit pulses. Digital filter 22 performs a low pass operation on these unit pulses to remove the jitter causing high frequency component of the pulses while preserving the total unit energy contained in the pulses. To avoid data errors, digital filter 22 ensures that transmit clock signal 26 does not have an abruptly changing clock rate by gradually changing the clock rate through spreading the unit pulse energy out over time. Though not shown, the unit pulse may be subdivided into several fractional unit pulses to further reduce output jitter.

The output of the low pass filter is added to a constant offset value corresponding to the nominal payload frequency. This sum is used as the frequency control input to NCO 24. The constant offset value could be added at the input of the filter, but since the magnitude of frequency deviation control signal 20 is typically much less than this constant offset value, it is significantly simpler to filter frequency deviation control signal 20 and avoid putting the constant offset value through the filtering process.

Figure 2:
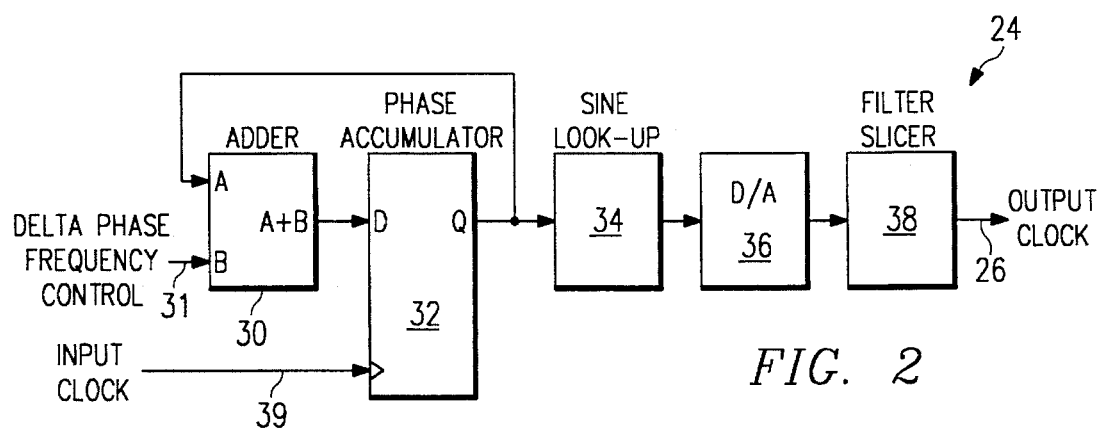
FIG. 2 illustrates a block diagram of a numerically controlled oscillator implemented in the preferred open loop desynchronizer.

FIG. 2 is a block diagram of NCO 24. NCO 24 includes an adder 30 that receives a delta phase frequency control signal 31 and drives a phase accumulator 32. A sine look-up table 34 receives accumulations from phase accumulator 32 and generates a digital sine wave which is converted into an analog sine wave by a digital to analog convertor 36. The analog sine wave is filtered and converted to a square wave clock by a filter slicer 38.

In operation, NCO 24 receives the delta phase frequency control signal 31, which is the combination of the constant offset value and the low pass filter output, from digital filter 22. Adder 30 adds delta phase frequency control signal 31 to an output of phase accumulator 32. The resulting sum becomes the new phase accumulator output when sampled by an input clock 39. Through continuous samples, the phase accumulator output increases uniformly each input clock cycle until adder 30 overflows to begin a new cycle. In this fashion, the output of phase accumulator 32 becomes a ramp function.

Sine look-up table 34 converts the ramp function output from phase accumulator 32 into a digital representation of a sine wave. The digital sine wave representation has fewer harmonics and is a purer signal than the ramp function output of phase accumulator 32. Digital to analog converter 36 converts the digital sine wave representation into a step approximation of an analog sine wave signal. The steps within the analog sine wave signal are smoothed out by filter slicer 38. Filter slicer 38 also converts the smoothed analog sine wave into a square wave signal that becomes transmit clock signal 26, having little, if any, jitter component.

The output of digital filter 22, which feeds adder 30 of NCO 24, is sampled once each NCO input cycle. NCO 24 creates a transmit clock signal 26 in response to the filtered unit pulses received from digital filter 22. Transmit clock signal 26 appropriately tracks the asynchronous payload rate to control the transmission of asynchronous data from FIFO buffer 18. The open loop nature of desynchronizer 10 controls asynchronous data transmission from FIFO buffer 18 by gradually letting extra data out and gradually closing gaps due to less data on synchronous channel 14. NCO 24 controls transmit clock signal 26 by increasing or decreasing the rate from the nominal payload frequency in response to the amount of data sent over the synchronous channel 14. The open loop design takes advantage of the zero drift nature of the NCO's synchronous digital design to completely eliminate mapping jitter, overshoot, and corrective feedback.

The output frequency of transmit clock signal 26 can be controlled over a wide range synchronous with input clock 39. The data path bit-width within NCO 24 determines the frequency and phase resolution of transmit clock signal 26. The output frequency can range from 0 Hz to one half the frequency of input clock 39 in steps of $$\frac{\text{input clock rate}}{M},$$

where M is the modulus of adder 30.

Digital filter 22 is designed so that the input into NCO 24 of a single unit pulse will result in a change in output value such that the summed samples from phase accumulator 32 will cause the phase of transmit clock 26 to advance by one complete cycle. For example, in the case of a 24 bit NCO, the summed sampled filter output response of phase accumulator 32 to a unit pulse input must be equal to $2^{24}$. If this requirement is met, transmit clock 26 will perfectly track the asynchronous payload rate and eliminate the need for any corrective feedback as needed in PLL desynchronizer designs.

Figure 3:
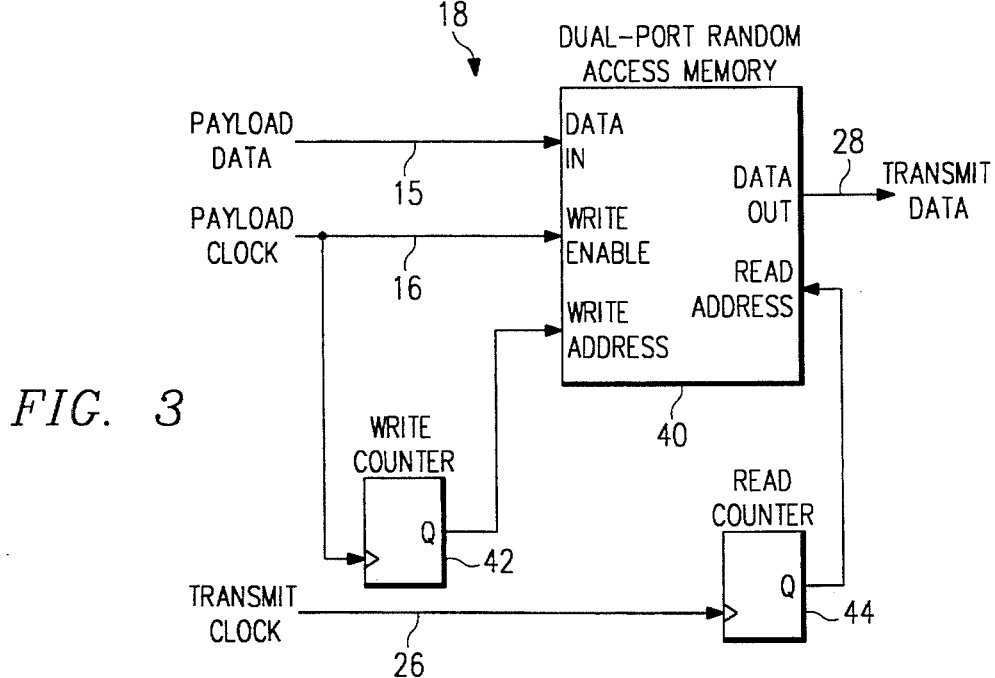
FIG. 3 illustrates a block diagram of a first in first out buffer.

FIG. 3 is a block diagram of FIFO buffer 18. FIFO buffer 18 includes a random access memory 40, a write counter 42, and a read counter 44. Asynchronous data from demapper 12 enters random access memory 40 over asynchronous payload data signal 15 according to payload clock signal 16. Payload clock signal 16 also controls write counter 42 in generating sequential write addresses for random access memory 40. Data written sequentially into random access memory 40 is also read out sequentially, establishing the first in, first out nature of FIFO buffer 18. Transmit clock 26, generated by NCO 24, controls read counter 44 in order to provide sequential read addresses such that random access memory 40 transmits data over transmit data signal 28 in the same order that data was stored within random access memory 40.

Figure 4:
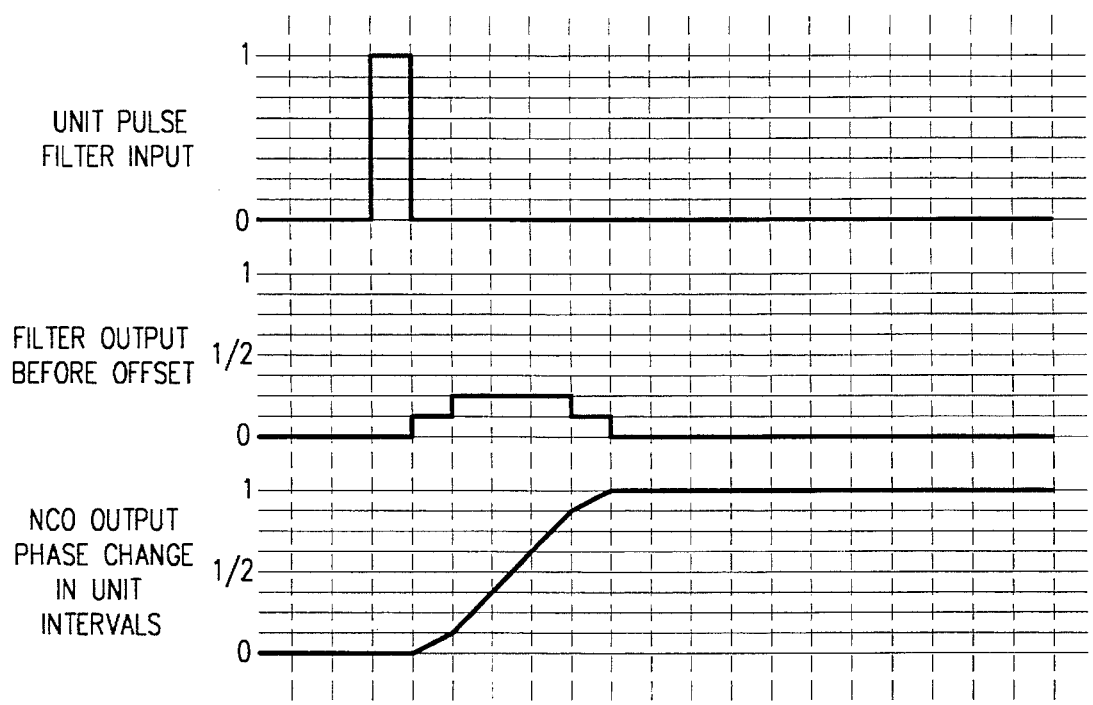
FIG. 4 illustrates an output phase plot showing the response of the digital filter and the NCO to an extra data bit being transported.

FIG. 4 is an output phase plot of frequency deviation control signal 20, digital filter 22 output, and NCO 24 output. As shown, digital filter 22 performs the low pass filter operation on the unit pulse of frequency deviation control signal 20 and spreads out the signal while still maintaining the energy contained in the unit pulse. The area under the unit pulse input to digital filter 22 is equal to the area under the digital filter 22 output before the constant offset value is added. A change in phase of the NCO output corresponds to the step increases of the digital filter output. The phase plot shows what happens to the output phase of NCO 24, which is a function of instantaneous frequency, due to one extra data bit sent over synchronous channel 14. Frequency and phase adjustments can be made to NCO 24 output in order to speed up transmit clock 26 to catch up with the data.

Figure 5:
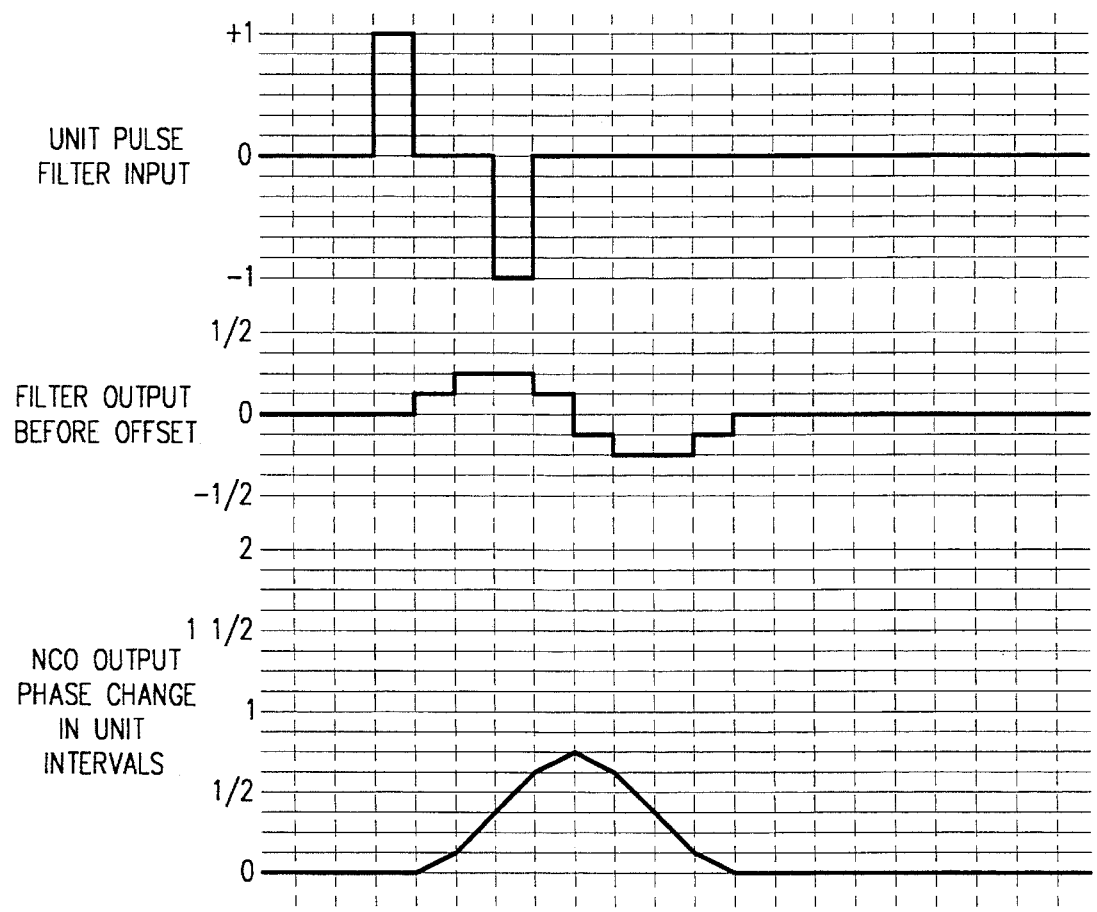
FIG. 5 illustrates an output phase plot showing the response of the digital filter and the NCO to transportation of an extra data bit following the transportation of one fewer data bit.

FIG. 5 is an output phase plot for a negative stuff (i.e. one extra data bit being transported) followed by a positive stuff (i.e. one fewer data bit being transported). The unit pulse energy of the positive and negative pulses is spread out over time by digital filter 22. The frequency variation of transmit clock 26 will follow the output of digital filter 22. The cumulative output phase change relative to the nominal phase rate is shown in the bottom graph. The output phase plots show no phase overshoot in the output response. Such a lack of phase overshoot is difficult to achieve in conventional PLL desynchronizer designs.

Since demapper circuit 12 generates frequency deviation control signal 20 that indicates when positive or negative stuff opportunities or pointer adjustments occur, there is no dependence on FIFO buffer 18 depth as required in conventional PLL desynchronizers. While variations in payload data arrival due to overhead and mapping within the synchronous channel will cause FIFO buffer depth variations, this will not result in output jitter, since the output frequency is not determined by FIFO buffer depth feedback. In this fashion, FIFO buffer depth mapping jitter can basically be ignored because there is no connection between FIFO depth and transmit clock 26 frequency due to the open loop design of desynchronizer 10. Therefore, any mapping jitter absorbed into FIFO buffer 18 due to instantaneous variations in the FIFO buffer depth do not show up as output jitter on the output from FIFO buffer 18.

Phase overshoot leading to jitter amplification can be completely eliminated by desynchronizer 10. By having absolute digital control of the phase and frequency of transmit clock 26 through digital filter 22 and NCO 24 without the complexity of analog feedback found in PLL systems, the impulse response due to bit stuffs or pointer adjustments can be tailored to completely eliminate phase overshoot. Instabilities, oscillations, and the need for mathematical precision found in feedback loops are avoided through this open loop implementation.

In summary, an open loop desynchronizer uses a digital filter and numerically controlled oscillator to generate a transmit clock signal that will track an asynchronous payload rate for asynchronous data carried over an asynchronous channel. A demapper generates a frequency deviation control signal from stuff bit or pointer adjustment control signals carried over the asynchronous channel. The demapper decodes deviations from the nominal stuff bit or pointer adjustment rate corresponding to a predetermined nominal payload frequency in order to drive a digital filter and, in turn, the numerically controlled oscillator such that an output frequency of a transmission clock is created to match the asynchronous payload rate. The demapper also reads the asynchronous payload data from the synchronous channel and writes this data to a FIFO buffer. The FIFO buffer receives the transmission clock from the numerically controlled oscillator and transmits the asynchronous data at the asynchronous payload rate determined by the transmission clock.

Thus, it is apparent that there has been provided, in accordance with the present invention, an open loop desynchronizer that satisfies the advantages set forth above. Although the preferred embodiment has been described in detail, it should be understood that various changes, substitutions, and alterations can be made herein. For example, though the numerically controlled oscillator implements a sine wave signal representation, a sine wave is not integral to the operation of the NCO and other output functions may be used with similar effectiveness. Other changes may be made by one skilled in the art without departing from the spirit and scope of the invention as defined by the following claims.

What is claimed is:

1. An open loop desynchronizer, comprising:

a demapper circuit for reading asynchronous data received over a synchronous channel, said synchronous channel having a nominal data rate, said demapper circuit generating a frequency deviation control signal that indicates instantaneous variations in nominal data rate;

a buffer circuit for storing said asynchronous data from said demapper circuit;

a numerically controlled oscillator circuit for generating a clock signal in response to said frequency deviation control signal, said clock signal controlling output of said asynchronous data from said buffer circuit, said numerically controlled oscillator generating said clock signal without feedback input.

2. The open loop desynchronizer of claim 1, further comprising:
a digital filter for removing high frequency jitter spectral components from said frequency deviation control signal.

3. The open loop desynchronizer of claim 2, wherein said digital filter generates a delta phase frequency control signal for said numerically controlled oscillator, said delta phase frequency control signal being a combination of the filtered frequency deviation control signal and a constant offset value corresponding to the nominal data rate of said synchronous channel.

4. The open loop desynchronizer of claim 1, wherein said frequency deviation control signal comprises positive and negative unit pulses that indicate more or less data respectively being transferred on said synchronous channel than the nominal data rate.

5. The open loop desynchronizer of claim 3, wherein said numerically controlled oscillator includes an adder for combining said delta phase frequency control signal with the sum of all previous delta phase frequency control signals.

6. The open loop desynchronizer of claim 5, wherein said numerically controlled oscillator further includes a phase accumulator for latching an output of said adder and providing said latched output to said adder for combination with a subsequent delta phase frequency control signal.

7. The open loop desynchronizer of claim 6, wherein said numerically controlled oscillator further includes a sine look up table circuit for generating a digital sine wave representation of said latched output.

8. The open loop desynchronizer of claim 7, wherein said numerically controlled oscillator further includes a digital to analog converter for generating an analog sine wave step approximation of said latched output from said digital sine wave representation.

9. The open loop desynchronizer of claim 8, wherein said numerically controlled oscillator further includes a filter slicer for smoothing and slicing said analog sine wave approximation into said clock signal having a square wave representation.

10. An open loop desynchronizer, comprising:
a demapper circuit for reading asynchronous data received over a synchronous channel, said demapper circuit generating a frequency deviation control signal that indicates instantaneous variations in a data nominal rate on said synchronous channel through positive and negative pulses;
a buffer circuit for storing said asynchronous data received from said demapper circuit;
a digital filter circuit for filtering said frequency deviation control signal in order to spread a total unit energy of each positive and negative pulse out over a specified time period, said digital filter circuit generating a delta phase frequency control signal that is a combination of said filtered frequency deviation control signal and a constant offset value corresponding to said nominal data rate on said synchronous channel;
a numerically controlled oscillator circuit for generating a transmit clock signal from said delta phase frequency control signal, said transmit clock signal controlling transmission of said stored asynchronous data from said buffer circuit, said numerically controlled oscillator circuit generating said transmit clock signal without feedback input.

11. The open loop desynchronizer of claim 10, wherein said buffer circuit is a first in, first out memory device.

12. The open loop desynchronizer of claim 10, wherein said numerically controlled oscillator generates said transmit clock signal with a square wave representation by generating a ramp signal from said delta phase frequency control signal, by converting said ramp signal into a digital sine wave representation, by converting said digital sine wave representation into an analog sine wave step approximation, and by smoothing and slicing said analog sine wave step approximation to produce said square wave representation.

13. The open loop desynchronizer of claim 10, wherein said demapper circuit decodes bit stuffs performed on said synchronous channel in generating said frequency deviation control signal.

14. The open loop desynchronizer of claim 10, wherein said demapper circuit decodes pointer adjustments performed on said synchronous channel in generating said frequency deviation control signal.

15. A method of desynchronizing asynchronous data from a synchronous channel, comprising the steps of:
reading the asynchronous data from the synchronous channel, the synchronous channel having a predetermined nominal data rate;
storing the asynchronous data into a buffer;
detecting deviations from said nominal data rate of the asynchronous channel;
generating a control signal in response to deviations from said nominal data rate of the synchronous channel;
generating an asynchronous clock signal in response to said control signal without feedback input;
transmitting the asynchronous data from said buffer in response to said asynchronous clock signal.

16. The method of claim 15, wherein said asynchronous clock generating step includes filtering said control signal to eliminate high frequency jitter spectral components by spreading out a total energy of said control signal over a specified time period.

17. The method of claim 16, wherein said asynchronous clock generating step further includes adding said filtered control signal to a constant offset value corresponding to said nominal data rate of the synchronous channel in order to generate a phase signal component of said asynchronous clock signal.

18. The method of claim 17, wherein said asynchronous clock generating step further includes accumulating successive values of said phase signal component.

19. The method of claim 18, wherein said asynchronous clock generating step further includes generating a digital sine wave representation of said accumulated successive phase signal component values.

20. The method of claim 19, wherein said asynchronous clock generating step further includes converting said digital sine wave representation into an analog sine wave step approximation.

21. The method of claim 20, wherein said asynchronous clock generating step further includes smoothing said analog sine wave step approximation into a smoothed sine wave approximation.

22. The method of claim 21, wherein said asynchronous clock generating step further includes converting said smoothed sine wave approximation into said asynchronous clock signal having a square wave representation.

\* \* \* \* \*